United States Patent [19]

Lemelson

[11] 4,342,038
[45] Jul. 27, 1982

[54] WEIGHING APPARATUS AND METHOD
[76] Inventor: Jerome H. Lemelson, 85 Rector St., Metuchen, N.J. 08840
[21] Appl. No.: 167,673
[22] Filed: Jul. 11, 1980
[51] Int. Cl.³ .................. G01D 9/00; G01D 15/18; G01G 23/38
[52] U.S. Cl. .................................. 346/9; 346/75; 177/2
[58] Field of Search .................. 346/9, 75, 10–12; 177/2, 12, 13

[56] References Cited
U.S. PATENT DOCUMENTS

| | | | |
|---|---|---|---|
| 2,792,208 | 5/1957 | Merrill et al. | 346/9 X |
| 3,871,490 | 3/1975 | Davis et al. | 177/13 X |
| 3,994,217 | 11/1976 | Archila | 177/2 X |
| 4,074,279 | 2/1978 | Ikeda et al. | 346/75 |
| 4,101,366 | 7/1978 | Teraoka et al. | 177/13 X |
| 4,119,161 | 10/1978 | Price et al. | 177/13 X |

Primary Examiner—George H. Miller, Jr.

[57] ABSTRACT

An apparatus and method for providing indicia on articles or packags, which indicia is an indication of such variables as identification, destination, weight, cost, postage or a combination of such variables. In one form, an article or container is disposed on a weighing device, such as a scale, and the weight of the article which is indicated when the scale balances, is automatically applied as a bar code, numerical indication or other form of indicia to a select portion of the surface of the article. In a particular form, an indication of postage is printed on the article or container placed on the platform, which indication is derived from a combination of the weight of the article and its destination, wherein the latter information is derived from the manual input device or a reading device which is operable to read a destination code or the address label of the article. In another form, such indicia is printed on an adhesivel label which is automatically applied by means of a mechanical device or a stream of air to a select portion of the surface of the article adjacent the side of the scale or an opening in the scale platform. In another form, a hand-held printing implement is operatively connected by flexible wire to a weight sensor at the scale and contains a printing device which is operated by electrical signals derived when the scale weights an article, for printing indicia on the article adjacent or against which the printing device is disposed.

13 Claims, 4 Drawing Figures

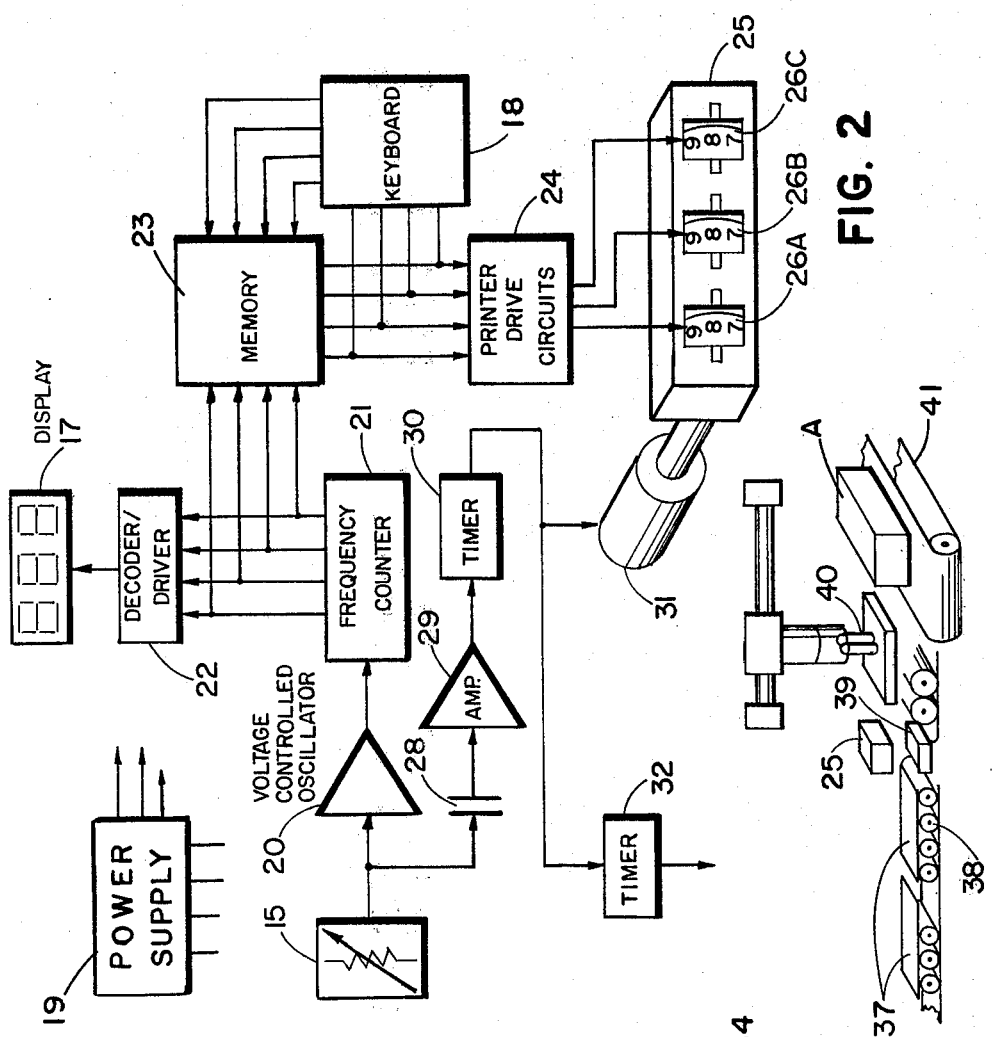
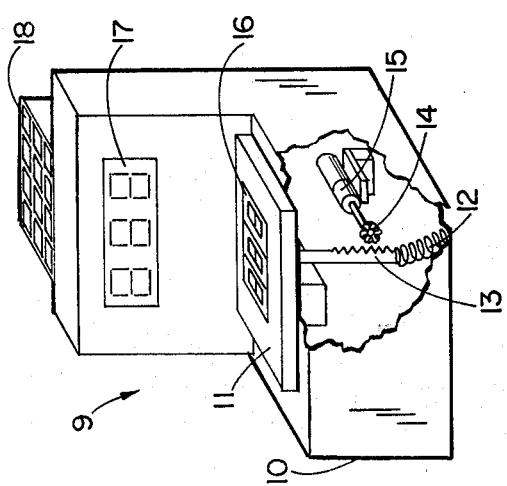
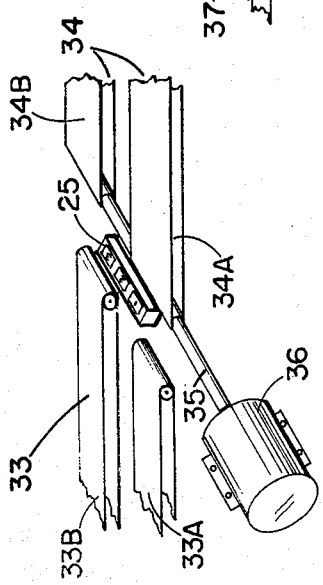

WEIGHING APPARATUS AND METHOD

SUMMARY OF THE INVENTION

This invention relates to an apparatus and method for automatically weighing and printing an indication of weight or other information derived, at least in part from such weighing, on the surface of an article or container being weighed on a scale. The apparatus is particularly applicable for the weighing and marking of containers and articles of food and packages to be mailed, wherein human effort required to mark such articles or containers or provide postage thereon is eliminated.

Operations involving the weighing and marking of articles with price information and the weighing and applying of postage to containers, generally involve a number of steps including the placement of an article on a scale, the visual reading of the scale, the manual operation of the postage or price printing device and/or the removal of a label or postage therefrom and the placement of same on the device which was weighed. These operations are not only time consuming but are subject to human error.

The instant invention involves the automatic weighing of an article or container and the automatic printing of indicia indicative of weight and/or other information directly on the article by an automatically operated device. Accordingly, it is a primary object of this invention to provide a new and improved apparatus and method for weighing and marking articles of manufacture and containers of articles and material so as to reduce human effort and errors.

Another object is to provide an apparatus and method which may be utilized to weigh different articles or quantities of material and to provide indicia directly on such articles, which indicia is an indication of the weight, pricing or postage associated with such articles.

Another object is to provide a new and improved apparatus and method for weighing and marking an article with an indication of weight, wherein such method involves computing the value or cost of the article and the marking or printing of such information directly on the article.

Another object is to provide an apparatus and method for weighing and predeterminately locating indicia or codes on an article which are indicative of the weight, and in certain instances, identification of the article, postage or other information and which are so located as to be easily automatically scanned as the article is conveyed so as to generate signals which may be used in computing the total cost or value of an order and/or destination of the article.

Another object is to provide an apparatus and method for weighing and providing an indication of the weight of articles without physically contacting said articles.

Another object is to provide an apparatus and method for weighing or otherwise identifying articles, printing an indication of the weight or indentification of the article on a label and automatically affixing such label to the surface of the article.

Another object is to provide an apparatus and method for weighing or otherwise identifying an article and providing indicia on the surface of the article by depositing particles or droplets of printing material on the article.

Another object is to provide an apparatus and method for automatically affixing proper postage to a select portion of a container to be shipped.

Another object is to provide an improved weighing scale containing supported thereby a printing device for applying select indicia to a surface of an article as or immediately after it is weighed.

Another object is to provide an apparatus and method for printing indicia on articles as they are weighed, which indicia is an indication of weight or other information derived from computations involving the weight of the article.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

IN THE DRAWINGS

FIG. 1 is an isometric view, with parts broken away for clarity, of a weighing scale which contains or supports means for applying a code or alpha-numeric characters to a surface of an article being weighed on the platform thereof.

FIG. 2 is a schematic diagram of electrical and mechanical components and subsystems employed in the operation of the scale of FIG. 1.

FIG. 3 is an isometric view of an automatic weighing and printing arrangement associated with a conveyor or conveyors of articles, and FIG. 4 is an isometric view of a modified form of the apparatus illustrated in FIG. 1 for applying printed labels to articles on the conveyor.

There is shown in FIG. 1 a weighing and printing scale assembly 9 having a weighing platform 11 supported by a base 10 which includes a housing for certain weighing, weight indicating and electronic components to be described. The weighing platform 11 is conventionally supported for vertical movement, by means of a conventional spring mechanism 12 which is connected to the platform through a rack gear toothed bar 13, the teeth of which engage and rotate a spur gear 14 as the platform 11 moves downwardly when a weight is placed thereon and upwardly after the weight is removed. The spur gear 14 is connected to a rotary potentiometer 15 which is electrically connected to scale electronics of the type illustrated in FIG. 2 for indicating the weight of an article placed on the platform 11 by means of a numerical character display 17 supported by the vertical, rear extension of the housing defining the support 10 or main frame of the scale. Potentiometer 15 has a variable resistance which varies in accordance with the rotation of spur gear 14 as an indication of the displacement of the rack gear 13 and the weight of the article disposed on platform 11.

Supported within a cavity 16 in the platform 11 or supported by the top wall of the front portion of the housing 10 immediately below the platform 11, are one or more printing devices, such as an array of electrically operated printing wheels of the type shown in FIG. 2, one or more ink jet character or code printers, an electrostatic or xerographic printing device, a laser or electron beam printer or other means or a label printer and applicator, which devices project their printing means, ink or label applying means upwardly through such cavity or recess 16 against the bottom surface of an article disposed thereacross on the upper surface of the platform 11, after the platform 11 has substantially come to rest with the container or article disposed thereon across the cavity 16.

Illustrated as supported in a subhousing adjacent the rear wall of the scale support 10 is a manual keyboard 18 which may be manually operated to enter variable data, such as cost of article weighed per pound, postal information such as destination, mileage or postal zone or other variable information. Such keyboard may also be disposed supported by either of the side walls of the housing or the front wall thereof or may be provided in a separate housing connected to the scale electronics by means of a suitable cable.

The control system illustrated in FIG. 2 includes scale electronics for computing information to be applied directly to the article disposed on the scale platform and for controlling the printing means therefor which is illustrated as an array of variably operable printing wheels 26, denoted 26A, 26B, 26C, etc. supported by a printing head 25 which is operable to be advanced and retracted through the opening 16 in the platform 11 by means of a bi-stable solenoid 31 supported by the platform or the main support 10 for the scale. As previously indicated, a suitable ink jet printing device containing a deflection controlled jet or jets of ink operable to provide dot-matrix characters as a line of such characters or a coded indicia against the bottom surface of the article disposed on the platform, may replace the printing wheel assembly or any other suitable printing means including a label printer and applicator may be used in its place.

The electronic control circuits illustrated in FIG. 2 are electrically operated by means of a power supply, such as a battery or transformer connected to a source of line current, the output of which is connected to properly energize all of the active circuits and components illustrated. Variable rotary potentiometer 15, which is connected to the shaft of spur gear 14, is operable to vary the frequency of a voltage controlled oscillator 20 but which may also comprise a single or dual slope integrator or other suitable means for converting changes in the electrical parameters of the variable potentiometer into a digital signal or signals.

The output of voltage controlled oscillator 20 is connected to a frequency counter circuit 21 which converts the signal received from the oscillator to a digital code representing the voltage controlled oscillator frequency, which is dependent upon the variation caused in the setting of the variable potentiometer 15 as determined by the weight of the article placed on the platform.

The coded output of the BCD frequency counter 21 is passed to a decoder-driver circuit 22 which converts the code and current levels to those necessary for the proper operation of display 17 which displays a representation of the weight of the article disposed on the platform 11. Although the circuits and displays may be operable to display any desired information derived at least in part from computation of the articles weight, such as price or postage, it is primarily employed to indicate the information which is actually printed by means of the printing device 25, on the surface of the article or may be operated to sequentially indicate different information or information resulting from selective operation of keys of the keyboard 18.

The output of the frequency counter 21 is also connected to a circuit 23, such as a microelectronic memory or computer plus memory, which may be employed to convert the codes received from the frequency counter to signals which are applicable to properly energize printer drive circuits forming part of an electronic chip 24 or portion of the computer memory circuits 23. Such printer drive circuits 24 are operable to provide signals for controlling a motor or plurality of motors driving the print wheels 26A, 26B, 26C, etc. to properly position the printing cuts thereof for printing the proper weight or other information on the surface of the article. Similarly, the outputs of the drive circuits 24, may be employed to properly operate a single wheel printer or ink jet head as it moves in a line or direction across the surface of the article to print a line of characters or code thereon or to effect such printing with respect to a label which is applied thereafter to the article.

The printer 25 responds to codes received from memory 23 and/or those received from the key operated switches of the keyboard 18 or from computing circuits provided in the chip or circuit board of which memory 23 forms a part and operable to compute the information to be printed from the signals received from the variable potentiometer 15 when the scale 11 has come to rest and signals selectively generated by the keyboard 18 indicative of cost per unit weight, destination distance or a postal zone or other variable information. In other words, the system illustrated in FIG. 2 may be operable to print such variable information as (a) weight per se, (b) cost of article, (c) postage, (d) destination, (e) combinations of such information.

The signals applied to the printer drive circuit 24 or the memory 23 may also be derived from another device such as a remote computer or hand-held manual input code generator.

When an article is placed on platform 11, its weight causes a change in the voltage output of potentiometer 15 which, in addition to that previously noted, causes a variable voltage signal to appear at capacitor 28, which is passed to an amplifier 29 which activates a timer circuit 30, such as a one-shot multivibrator which, after a suitable delay, supplies power to a solenoid 31 and when activated thereby, such solenoid advances the printer wheel assembly 25 after the printing wheels thereof have come to rest, through the cavity or opening 16 in the scale platform and causes the printing cuts of the wheels are aligned for printing, to make contact with the bottom surface of the article or container which is disposed across such opening so as to print a requisite information on such bottom wall.

A timer 32, which may also comprise a one-shot multivibrator or other suitable means, is connected to the output of timer 30 so as to provide a signal for operating a manipulator, pusher device or conveyor for automatically removing the article from the scale platform after a suitable time delay sufficient to allow printer 25 to operate and retract from the surface of the article without smearing the printed information thereon.

As indicated above, if memory 23 contains a suitable computing circuit, keyboard 18 may be connected thereto to introduce variable data, such as postal or cost information, into the print computing circuit to properly energize the printer drive circuit 24 for effecting proper operation of the print wheels or other printing device to print desired information against the surface of the article or container aligned with the opening 16 in the scale platform 11.

Memory 23 and printer drive circuits 24 may be suitably modified for properly controlling the movement of a single print head, such as an ink jet printer, single printing wheel or printing ball across the opening 16 in a given direction to effect the printing of a plurality of indicia or characters representative of the information to be printed on the surface of the article disposed across the opening 16.

It is noted that the printing head 25 may also be disposed immediately adjacent the platform 11 supported by the scale housing and operable to advance against a side wall of an article disposed on the platform 11 to effect printing of the desired information thereon. In such arrangement, a stop or stops for predeterminately locating the container and retaining it on the upper surface of the platform during the printing operation, may be attached to the platform or the printing head may be properly controlled in its operation to engage and properly print characters on a side wall or the top wall of the container disposed on the platform.

In FIG. 3, a printing device 25 of the type shown in FIG. 2 or other suitable printing device of the type described, is provided as part of a conveyorized or otherwise automatic conveying system for articles defined at least in part by a plurality of conveyor belts 33A and 33B feeding articles to respective conveyor belts 34A and 34B which are aligned with the respective belts 33A and 33B a short distance therefrom between which is located the printing head 25. A common roll of 35, around which conveyor belts 34A and 34B are driven, is driven by a controlled constant speed motor 36 and such motor is controlled in its operation by the timer 32 illustrated in FIG. 2. Printer 25 is activated, as described, when motor 36 is stopped under the control of timer 32, and operates to advance its printing wheels into engagement with the bottom surface of the article disposed between conveyors 33 and 34, preferably during the interval the motor 36 is stopped in operation. The two belt system is employed to provide a space between the belts, across which space those portions of the articles on which printing is effected extend so that the printed material will not smear as the article is continued in its conveyance.

In FIG. 4 is shown an alternate form of the invention wherein labels 37 are conveyed by a roller or belt conveyor 38 to a printing location 39 at which location such labels are individually printed by means of a printer 25 of the type described and controlled as described. The printed label then proceeds along the conveyor to the vicinity of the article, wherein a vacuum operated manipulator head 40 engages the individual label disposed therebeneath, picks it up and carries it over an article A disposed immediately adjacent thereto on an auxiliary conveyor 41 to properly secure the label to the upper surface of the article after which the article is conveyed away from the label applying location and a second article is carried on conveyor 41 to such location. Timer 32 may be employed to control the operation of the conveyors 38 and 41 and the manipulator 40 for picking up and applying the label to the surface of the article while timer 30 illustrated in FIG. 2 may be employed to control the solenoid activating the print head 25 to print the desired information on the label disposed aligned therewith. The remaining controls illustrated in FIG. 2 are employed for controlling the operation of the printing device itself to properly print characters on the label.

It is noted that the scale weighing system may comprise a counter-balanced scale platform with the variable potentiometer 15 replaced by a conductive elastomer, the resistivity of which decreases proportionately with the degree it is compressed by movement of the scale platform thereagainst or an extension of the scale platform such as a piston or bar, so as to serve the same function as the variable potentiometer. In such case, the elastomer may also serve as the spring element, thereby eliminating such mechanical components as the spring 12, toothed rack 13 and pinion gear 14 as well as their supporting structures and mechanisms. Such an arrangement may be employed in an operating scale per se for activating an electronic display in accordance with weight imposed against and compressing the conductive elastomer.

In yet another embodiment of the invention, such a conductive elastomer may serve primarily as the variable resistance, with the spring return of the scale effected as the result of return of a mechanical metal spring or springs employed to counterbalance the platform, to its zero or unweighed position, an arrangement in which scale components are substantially simplified and improved.

I claim:

1. A weighing and marking apparatus comprising in combination with a support including a platform adapted to receive an article, means supported by said support responsive to the weight of an article disposed on said platform for generating an electrical signal which is representative of the article's weight, means for printing a plurality of indicia directly against the surface of an article disposed on said platform, control means for said printing means for varying the operation thereof to cause said printing means to vary the indicia it applies to the surface of an article, said control means being operatively connected to said means responsive to the weight of an article and operable so as to predeterminately vary the operation of said printing means while an article is disposed on said platform and means operable after said printing means has been predeterminately varied to permit said printing means to print indicia on the surface of an article located on said platform which indicia is indicative of the article's weight, said printing means including means for variably forming printing ink into the configuration of selected characters and means for moving said variably formed ink configurations from a first location away from the surface of an article disposed on said scale through space to a selected portion of said article's surface to disposed said ink in the configuration of said characters on the surface of said article.

2. An apparatus in accordance with claim 1 wherein said application printing means comprises an electromechanical, variable printing device operable to impression print numbers on a surface, an opening in said platform aligned with a portion of the surface of an article disposed on said platform for weighing, said electromechanical printing device being operable to move at least parts thereof through said opening into engagement with the surface of an article disposed on said platform, upon becoming activated, to effect the printing of characters indicative of the weight of the article on the surface thereof aligned with said opening.

3. An apparatus in accordance with claim 1 wherein said platform contains an opening therein across which opening a portion of the surface of an article being weighed on said platform extends, said application means comprising means for generating a stream of particles and directing said particles through said opening against a surface of an article disposed across said opening in a manner so as to deposit said particles on the surface of the article in a configuration representative of the weight of the article.

4. An apparatus in accordance with claim 1 wherein said platform contains an opening therein across which opening a portion of the surface of an article being weighed on said platform extends, said application means comprising means for generating and directing an intense radiation beam through said opening so as to intersect the surface of an article disposed on said platform and means for variably operating said beam to cause same to burn the surface of an article it intersects in a configuration which is representative of the weight of the article.

5. A weighing and printing apparatus comprising:
a support for an article to be weighed, transducing means sensitive to the weight of an article disposed on said support and operable to generate signals which vary with variations in the weight sensed thereby and which are representative of the weight of a particular article disposed on said support,
printing means including a printing head for providing a printed indicia which is indicative of the output of said transducing means,
first control means for variably operating said printing means to preset same to print a particular weight indication,
servo means for causing said printing means to deposit printing material on the surface of an article disposed on said support and to effect the printing thereon of characters, and
means for operating said first control means and said servo means in sequence after disposing an article on said support to move said support from a position whereby said printing means is away from said article to a position whereby said printing head is in engagement with the surface of said article so as to effect the printing of indicia on a surface of said article.

6. An apparatus in accordance with claim 5 wherein said support contains an upper surface on which articles to be weighed are disposed, an opening in said upper surface, said printing means being disposed within said opening beneath said upper surface, said servo means being operable to move said printing means upwardly through said opening to engage the bottom surface of an article disposed on said upper surface across the opening therein.

7. An apparatus in accordance with claim 5 including means for aligning an article on said support with a surface thereof aligned with said printing means whereby operation of said servo means will bring said printing means into engagement with said surface.

8. An apparatus in accordance with claim 5 wherein said printing means comprises particle dispensing means and means for controlling dispensed particles to deposit indicia on said article.

9. A method of marking articles such as product containers with recorded information which varies in accordance with the weight of the articles comprising:
(a) disposing an article to be marked on the platform of a scale with at least a portion of the surface of the article predeterminately located on said scale platform and said article exerting its full weight against the scale platform,
(b) sensing said article on said scale and variably controlling a marking means for said article in accordance with the weight of said article so as to cause said marking means to operatively deposit a marking material directly against a select portion of the surface of said article on said scale in a pattern defining an array of indicia which may be visually read and which define an indication of the article's weight.

10. A method in accordance with claim 9 wherein said marking means is operable to propel said marking material through space therefrom against the surface of said article disposed on said platform in a predetermined pattern thereon.

11. A method in accordance with claim 9 wherein said marking means is operable to engage and print said indicia against a select portion of the surface of said article.

12. A method in accordance with claim 11 wherein said marking means comprises a support and a plurality of separately driveable printing wheels each containing a plurality of indicia and means for predeterminately controlling said printing wheels in accordance with the weight of the article to align respective indicia by printing location further comprising controlling relative movement between said plurality of printing wheels and a surface of said article when said printing wheels are properly aligned to effect the printing engagement of select portions of said wheels against a select portion of the surface of said article for printing indicia thereon of predetermined configuration.

13. A method in accordance with claim 9 wherein said printing means is located beneath the platform of the scale used to weigh said article and is operatively moveable upward into engagement with a surface of said article, said method including engaging said printing means against said select portion of the surface of said article when all of said wheels of said printing means are properly aligned for printing an indication of the weight of said article on the surface thereof.

* * * * *